(12) United States Patent
Chen

(10) Patent No.: US 8,659,837 B2
(45) Date of Patent: Feb. 25, 2014

(54) ADJUSTABLE LENS STRUCTURE

(75) Inventor: Shu-Ying Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/488,687

(22) Filed: Jun. 5, 2012

(65) Prior Publication Data

US 2013/0113978 A1    May 9, 2013

(30) Foreign Application Priority Data

Nov. 8, 2011    (TW) .............................. 100140622 A

(51) Int. Cl.
*G02B 15/14*    (2006.01)
(52) U.S. Cl.
USPC ........................................................ 359/694
(58) Field of Classification Search
USPC ................................................ 359/694–702
See application file for complete search history.

(56) References Cited

U.S. PATENT DOCUMENTS 7,194,203 B2 * 3/2007 Omiya et al. .................. 396/75

FOREIGN PATENT DOCUMENTS

| CN | 201780665 | 3/2011 |
| TW | M261721 | 4/2005 |
| TW | M338372 | 8/2008 |

* cited by examiner

*Primary Examiner* — James Jones
(74) *Attorney, Agent, or Firm* — Altis Law Group, Inc.

(57) ABSTRACT

An adjustable lens structure includes a lens housing, a lens module, a rotatable lens seat, and a shifting apparatus. The lens housing has a front housing and a top housing located behind the front housing. The front housing is a hollow cylinder and the rotatable lens seat is placed inside the front housing. The lens module is placed on the rotatable lens seat. The shifting apparatus is engaged with the top housing. The shifting apparatus has a gear assembly engaged with the rotatable lens seat to provide adjustable shooting angle for the lens module.

9 Claims, 5 Drawing Sheets

ADJUSTABLE LENS STRUCTURE

BACKGROUND

1. Technical Field

The invention is related to an adjustable lens structure, and particularly to an adjustable lens structure for smart phone users to capture images.

2. Description of Related Art

Modularized image lens can be found in portable 3C electronic products, cameras, monitoring systems, and smart phones. The main components of the image lens module include an image lens, an image sensor and circuit board. The range of images captured by the image lens module may be adjusted by modifying the design of the optical lenses. The lens modules are placed in a housing that is engaged with a rotatable connector and placed on a seat. The range of images captured by the lens module is flexible and changeable according to user's position. The shooting angle of the image module is changed by moving the rotatable connector. However, the rotatable connector and the seat of conventional lens structure are complicated and bulky. They limit the development of the lens structure to be slim and light.

BRIEF DESCRIPTION OF THE DRAWINGS

The components in the drawings are not necessarily drawn to scale, the emphasis instead being placed upon clearly illustrating the principles of an adjustable lens structure. Moreover, in the drawings, like reference numerals designate corresponding parts throughout the several views.

DETAILED DESCRIPTION

The disclosure will be described with references to the accompanying diagrams.

Figure 1:
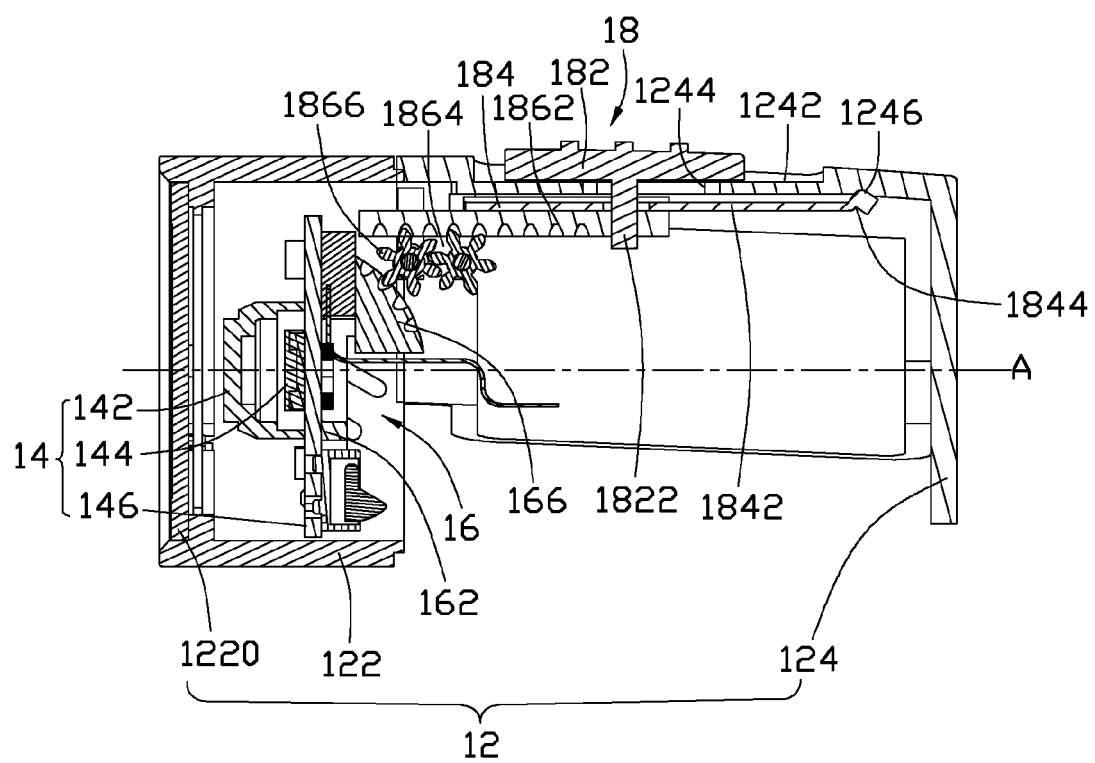
FIG. 1 is a cross-sectional diagram of an adjustable lens structure of the disclosure.
Figure 2:
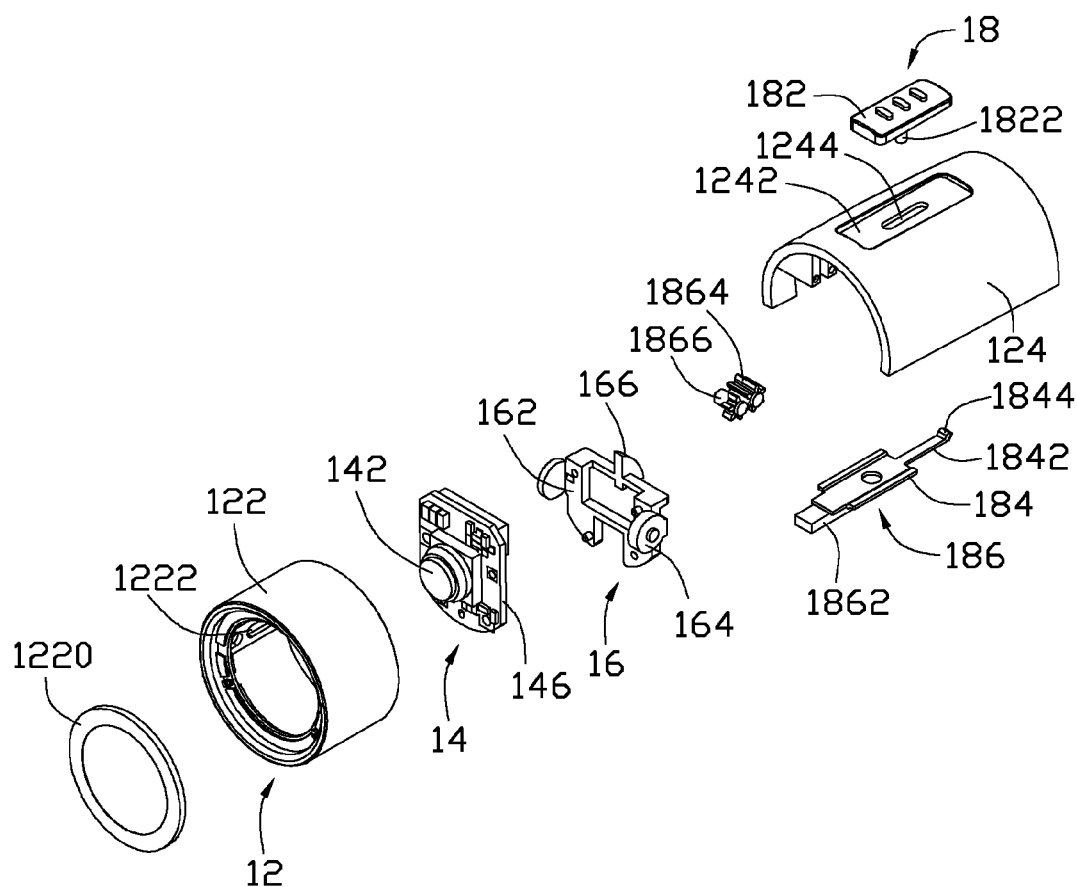
FIG. 2 is an exploded view of the adjustable lens structure.

Please refer to FIG. 1 and FIG. 2. FIG. 1 is a cross-sectional diagram of an adjustable lens structure 10 of the disclosure. FIG. 2 is an exploded view of the adjustable lens structure 10 of the disclosure. The adjustable lens structure 10 includes a lens housing 12, a lens module 14, a rotatable lens seat 16, and a shifting apparatus 18. The lens housing 12 includes a front housing 122 and a top housing 124. The front housing 122 of the present embodiment is a hollow cylinder. The shape of the front housing 122 may be modified as requirement. The housing 12 further includes a transparent front glass 1220 to seal the front housing 122 at a front end of the lens housing 12.

The rotatable lens seat 16 is located inside the front housing 122 and used for mounting the lens module 14. The lens module 14 includes a lens 142, an image sensor 144, and a circuit board 146. The image sensor 144 is located on the circuit board 146. The lens 142 is placed in front of the image sensor 144 and mounted on the circuit board 146. Images captured by the lens 142 are converted into electrical signals by the image sensor 144 and transmitted by circuits of the circuit board 146. The lens module 14 is located inside the front housing 122 and synchronously moves with the rotatable lens seat 16. The rotatable lens seat 16 has a mounting frame 162 and a pair of knobs 164 placed at both ends of the mounting frame 162. The rotatable lens seat 16 has a bevel gear 166 connected to a back surface of the mounting frame 162. The lens module 14 is mounted on the mounting frame 162. The knobs 164 are engaged correspondingly to a cavity 1222 embedded in an inner surface of the top housing 122. Accordingly, the lens module 14 is sychronized with the rotation of the rotatable lens seat 16 inside the front housing 122.

The top housing 124 of the lens housing 12 is positioned behind the front housing 122. The shifting apparatus 18 is engaged to the top housing 124. The shifting apparatus 18 includes a slide key 182, a slide bracket 184, and a gear assembly 186. The gear assembly 186 further includes a gear rack 1862 and at least two gears 1864, 1866. The slide key 182 is located in a slide trough 1242 positioned on a top surface of the top housing 124.

The slide key 182 has a rod 1822 extended from a bottom surface of the slide key 182. The rod 1822 is inserted into a slit 1244 positioned in the center of the trough 1242. The rod 1822 inserts into the slit 1244 to engage the slide bracket 184 and the gear rack 1862 to the inner surface of the top housing 124. The slide bracket 184 and the gear rack 1862 are moved with the slide key 182 to slide back and forth. The gears 1864, 1866 are meshed with each other and located at the front end of the top housing 124. The gear 1864 is further meshed with the gear rack 1862, and the other gear 1866 is meshed with the bevel gear 166 of the rotatable lens seat 16 if the top housing 124 and the front housing 122 are engaged. The slide key 182 controls the movement of the gear rack 1862 and the rotation of the gears 1864, 1866 that subsequently drives the rotatable lens seat 16 to rotate. In addition to drive the gears 1864, 1866, the slide key 182 orients the shooting angle of the lens module 14. Users may adjust orientation of the lens module 14 easily by pushing or pulling the slide key 182.

Figure 3:
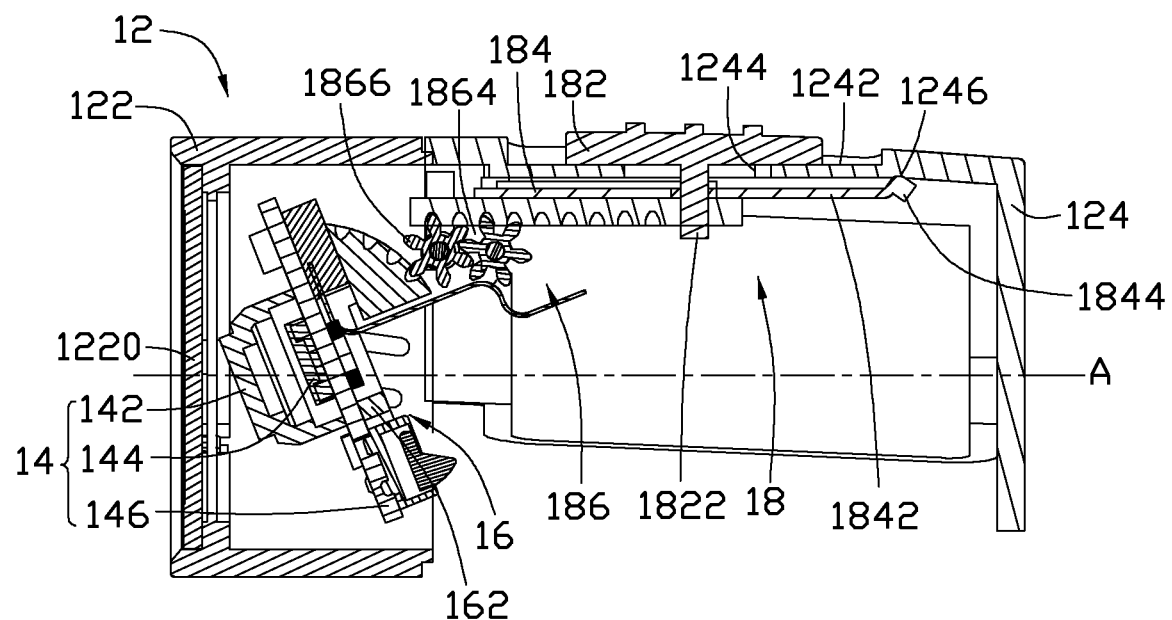
FIG. 3 is a cross-sectional diagram showing the adjustable lens structure when the lens is pointing downwards.
Figure 4:
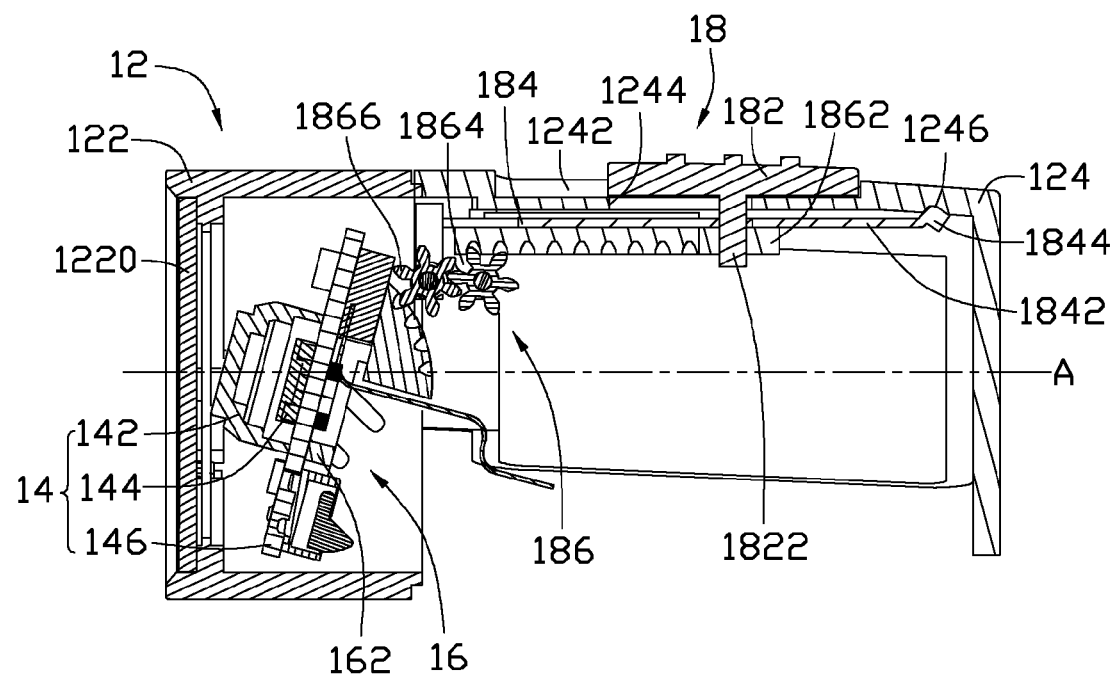
FIG. 4 is a cross-sectional diagram showing the adjustable lens structure when the lens is pointing upwards.

For a better illustration, please refer to FIG. 3 and FIG. 4. When the slide key 162 is pushed forward (closed to) the front housing 122, the gear rack 1862 is moved along the same direction to drive the gear 1864 rotating counterclockwise. Thus, the other gear 1866 rotates clockwise and lends the rotatable lens seat 16 to rotate counterclockwise. The counterclockwise rotation of the rotatable lens seat 16 makes the lens 142 of the lens module 14 look down. Therefore, pointing the lens module 14 downwards is synchronized with the forward movement of the slide key 182. On the other hand, when user pushes the slide key 182 backward (away from) the front housing 122, the gear rack 1862 synchronously moves backward and pushes the gear 1864 rotating clockwise. The other gear 1866 rotates counterclockwise and the rotatable lens seat 16 rotates clockwise. Therefore, the lens module 14 is adjusted to point upwards according to user's operation.

Figure 5:
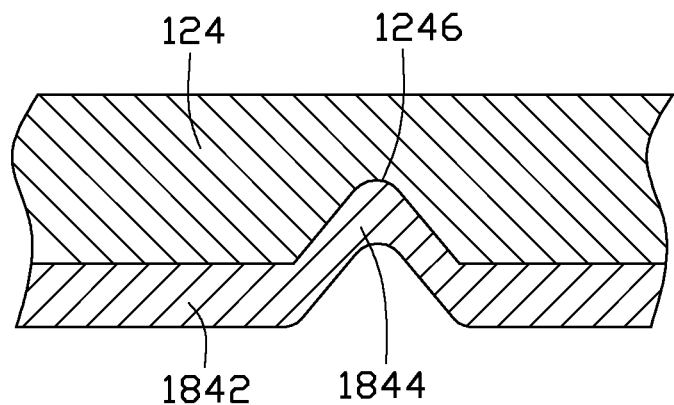
FIG. 5 is an enlarged diagram showing a slide bracket and a locating flake of the adjustable lens structure.

The slide bracket 184 is moved synchronously with the slide key 182 and the gear rack 1862 to a predetermined position. The slide bracket 184 has a locating flake 1842 which is flexible and tight against the inner side of the top housing 124. The locating flake 1842 has a protrusion 1844 at an end, and the protrusion 1844 is engaged to at least one recess 1246 on the inner surface of the top housing 124 (see FIG. 5). When the protrusion 1844 is moved with the slide bracket 184 to locate the protrusion 1844 in the recess 1246, the gear rack 1862 is placed at a predetermined position that drives the rotatable lens seat 16 to rotate to a predetermined angle. The shooting angles of the lens module 14 may be maintained at different degrees depending on the number and the position of the recess 1246. For example, the shooting angle of the lens module 14 in FIG. 1 is maintained at zero degree along a line A, which passes through the center of the lens module 14 and is horizontal. The shooting angle of the lens module 14 in FIG. 3 is maintained at 15 degrees below the line A. The shooting angle of the lens module 14 in FIG. 4 is maintained in 15 degrees above the line A. The shooting angle of the lens module 14 may be maintained at a greater degree, liar example 30 degrees, below the line A and preset to turn of the lens module 14 at this position.

The adjustable lens structure 10 of the disclosure has the gear assembly inside the front housing 122 and the top housing 124 to modify the shooting angle of the lens module 14. The locating flake 1842 maintains the position of the lens module 14. The conventional rotatable connector and the seat are no longer required. The adjustable lens structure 10 of the disclosure has advantages of low cost, ease of assembly, ease of maintaining shooting angle, and good performance.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. An adjustable lens structure, comprising:
   a lens housing, comprising:
      at front housing; and
      a top housing located behind the front housing;
   a lens module:
   at rotatable lens seat to mount the lens module wherein the rotatable lens seat comprises:
      a mounting frame;
      a pair of knobs placed at both ends of the mounting frame; and
      a bevel gear connected to a back surface of the mounting frame; and
   a shifting apparatus engaged with the top housing, the shifting apparatus comprising a gear assembly engaged with the rotatable lens seat;
   wherein the front housing is a hollow cylinder and the rotatable lens seat is placed inside the front housing.

2. The adjustable lens structure of claim 1, wherein the front housing further comprises a front glass placed in front of the front housing.

3. The adjustable lens structure of claim 1, wherein the lens module further comprises:
   a circuit board;
   an image sensor placed on the circuit board; and
   a lens positioned in from of the image sensor and fixed to the circuit board.

4. The adjustable lens structure of claim 1, wherein the lens module is mounted on the mounting frame, and the front housing further comprises a trough embedded in an inner surface of the front housing to engage with the knobs.

5. The adjustable lens structure of claim 4, wherein the shifting apparatus further comprises:
   a slide key engaged in a slide trough on the top housing; and
   a slide bracket;
   wherein the slide trough comprises a slit, and the slide key comprises a rod inserting into the slit.

6. The adjustable lens structure of claim 5, wherein the gear assembly further comprises:
   a gear rack; and
   at least two gears located inside the top housing and meshed with each other;
   wherein the gear rack is meshed with one gear, and the other gear is meshed with the bevel gear of the rotatable lens seat when the front housing and the top housing is engaged.

7. The adjustable lens structure of claim 5, wherein the rod of the slide key inserting into the sliding slit to engage the slide bracket and the gear rack to the inner surface of the top housing.

8. The adjustable lens structure of claim 5, wherein the slide bracket comprises a locating flake, and the locating flake is flexible and tight against the inner surface of the top housing.

9. The adjustable lens structure of claim 8, wherein the locating flake comprises a protrusion at one end against the inner surface of the top housing, and the protrusion is engaged to at least one recess located on the inner surface of the top housing.

* * * * *